US009926823B2

(12) United States Patent
Ardanese et al.

(10) Patent No.: US 9,926,823 B2
(45) Date of Patent: Mar. 27, 2018

(54) SYSTEM AND METHOD FOR CONTROLLING DETECTING AND CLEANING DIESEL-EXHAUST-FLUID INJECTOR DEPOSITS

(71) Applicant: GM GLOBAL TECHNOLOGY OPERATIONS LLC, Detroit, MI (US)

(72) Inventors: Raffaello Ardanese, Bloomfield Hills, MI (US); Giovanni David, Turin (IT); Luciano Nunziato Di Perna, Troy, MI (US); Pablo E Hernandez Garcia, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 71 days.

(21) Appl. No.: 15/233,261

(22) Filed: Aug. 10, 2016

(65) Prior Publication Data
US 2018/0045096 A1    Feb. 15, 2018

(51) Int. Cl.
| | | |
|---|---|---|
| *F01N 3/00* | (2006.01) | |
| *F01N 3/20* | (2006.01) | |
| *F01N 3/10* | (2006.01) | |
| *B01D 53/94* | (2006.01) | |
| *B08B 9/08* | (2006.01) | |

(52) U.S. Cl.
CPC ......... *F01N 3/208* (2013.01); *B01D 53/9477* (2013.01); *B01D 53/9495* (2013.01); *B08B 9/0865* (2013.01); *F01N 3/103* (2013.01); *B01D 2255/904* (2013.01); *F01N 2610/02* (2013.01); *F01N 2900/0416* (2013.01)

(58) Field of Classification Search
USPC .................. 60/274, 286, 295, 297, 301, 303
See application file for complete search history.

(56) References Cited

U.S. PATENT DOCUMENTS

| | | | | |
|---|---|---|---|---|
| 7,703,276 | B2 * | 4/2010 | Ueno | F01N 3/208 239/132 |
| 8,478,510 | B2 * | 7/2013 | Alark | F02D 41/221 123/479 |
| 9,194,280 | B2 * | 11/2015 | Berkemeier | F02M 53/04 |

(Continued)

*Primary Examiner* — Binh Q Tran
(74) *Attorney, Agent, or Firm* — Quinn IP Law

(57) ABSTRACT

A method for controlling an exhaust after-treatment system connected to a diesel engine via a gas passage and having a diesel oxidation catalyst (DOC) and a "diesel-exhaust-fluid" (DEF) injector arranged downstream of the DOC and upstream of a selective catalytic reduction catalyst (SCR) includes detecting a flow of exhaust gas emitted by the engine into the gas passage. The method also includes detecting a level of nitrogen oxides ($NO_x$) in the exhaust gas downstream of the SCR. The method additionally includes activating the DEF injector for a period of time to reduce the level of $NO_x$ to a predetermined $NO_x$ value. Furthermore, the method includes regulating an injection of fuel upstream of the DOC to clean the DEF injector via a stream of superheated exhaust gas if the period of time used to reduce the level of $NO_x$ to the predetermined $NO_x$ value is greater than a predetermined threshold value.

20 Claims, 2 Drawing Sheets

(56) References Cited

U.S. PATENT DOCUMENTS

| | | | |
|---|---|---|---|
| 9,255,511 B2* | 2/2016 | Watanabe | F01N 3/208 |
| 9,605,574 B2* | 3/2017 | Nihongi | F01N 3/2066 |
| 2010/0250090 A1* | 9/2010 | Jasinkiewicz | F01N 3/0253 |
| | | | 701/102 |

* cited by examiner

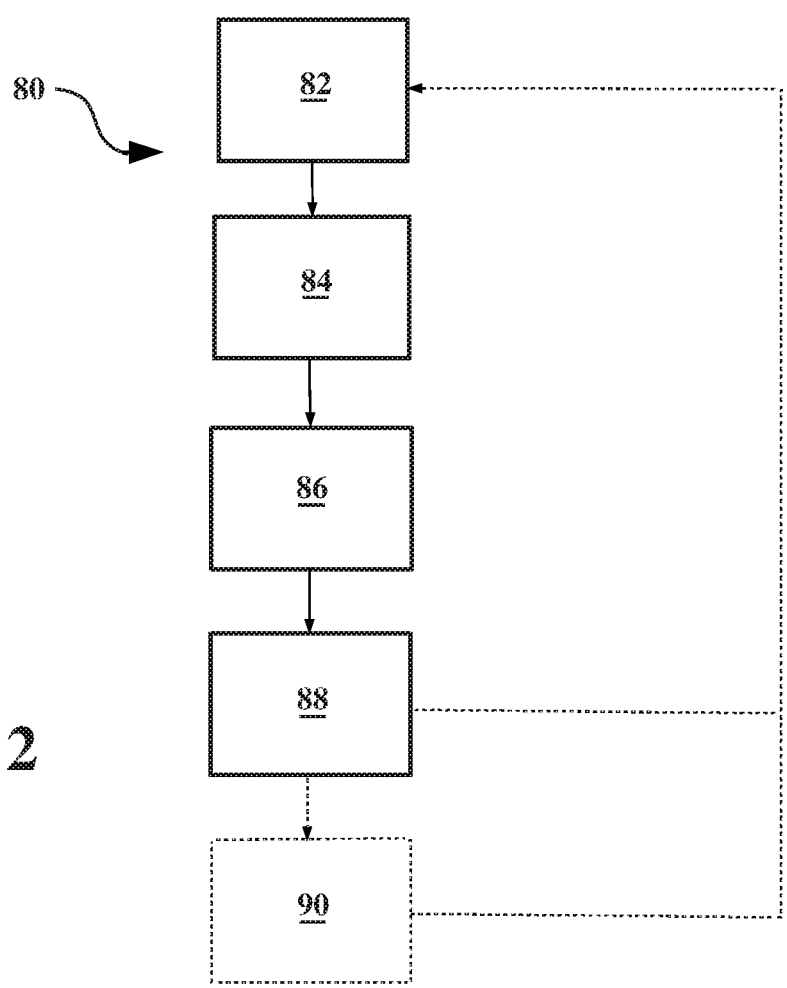

SYSTEM AND METHOD FOR CONTROLLING DETECTING AND CLEANING DIESEL-EXHAUST-FLUID INJECTOR DEPOSITS

TECHNICAL FIELD

The present disclosure is drawn to a system and a method devised to detect and clean deposits on a diesel-exhaust-fluid (DEF) injector in an internal combustion engine.

BACKGROUND

Various exhaust after-treatment (AT) devices, such as particulate filters and other devices, have been developed to effectively limit exhaust emissions from internal combustion engines. One of the exhaust after-treatment devices frequently used in a modern lean burn internal combustion engine, such as a compression-ignition type, is a selective catalytic reduction catalyst (SCR).

The SCR is configured to convert nitrogen oxides ($NO_x$) into diatomic nitrogen ($N_2$) and water ($H_2O$) with the aid of the $NO_2$ generated by another exhaust after-treatment device, typically the diesel oxidation catalyst (DOC). For effective removal of $NO_x$, the SCR conversion process additionally requires a predetermined amount of ammonia ($NH_3$) to be present in the exhaust gas flow.

The SCR conversion process may additionally require a controlled or metered amount of a reductant having a general name of "diesel-exhaust-fluid" (DEF) when the reductant is employed in diesel engines. Such a reductant may be an aqueous solution of urea that includes water and ammonia.

SUMMARY

A method uses a controller to regulate operation of an exhaust after-treatment (AT) system connected to a diesel internal combustion engine via a gas passage and having a diesel oxidation catalyst (DOC) and a "diesel-exhaust-fluid" (DEF) injector arranged downstream of the DOC and upstream of a selective catalytic reduction catalyst (SCR). The method includes detecting an operation of the engine generating a flow of exhaust gas directed into the gas passage. The method also includes detecting a level of nitrogen oxides ($NO_x$) in the exhaust gas downstream of the SCR using a $NO_x$ sensor in communication with the controller. The method additionally includes activating the DEF injector for a period of time to reduce the level of $NO_x$ downstream of the SCR to a predetermined $NO_x$ value. Furthermore, the method includes regulating an injection of fuel upstream of the SCR to generate a stream of superheated exhaust gas and thereby clean the DEF injector if the period of time used to reduce the level of $NO_x$ downstream of the SCR to the predetermined $NO_x$ value is greater than a predetermined threshold period of time.

The controller can include a timer. In such a case, the method can additionally include assessing the period of time used to activate the DEF injector to reduce the level of $NO_x$ downstream of the SCR to the predetermined $NO_x$ value using the timer.

The AT system can additionally include a solenoid in electronic communication with the controller and operative to trigger the DEF injector. In such a case, the method can also include correlating the period of time used to activate the DEF injector with a long-term adaption factor (LTAF), i.e., a multiplication factor, used by the controller to activate the solenoid. Additionally, the method can include correlating the predetermined threshold period of time used to activate the DEF injector with a first threshold LTAF used by the controller to activate the solenoid.

The controller can be programmed with a look-up table correlating the period of time used to activate the DEF injector with the LTAF.

The DEF injector can include a spray tip configured to direct the DEF into the gas passage. The first threshold LTAF can be indicative of a urea deposit having formed at the spray tip of the DEF injector, in which case, a spray pattern generated by the DEF injector can be negatively impacted by the urea deposit.

The act of regulating the injection of fuel can be configured to burn off the urea deposit at the spray tip of the DEF injector.

The controller can be programmed with a second threshold LTAF indicative of a predetermined amount of $NO_x$ detected downstream of the SCR. In such a case, the second threshold LTAF is greater than the first threshold LTAF, and the method can additionally include generating a sensory signal if the second threshold LTAF is reached.

The diesel engine can be installed in a vehicle. The second threshold LTAF can be in a range of 1.1-1.3.

The second threshold LTAF can be greater than the first threshold LTAF by at least 10%.

The engine may include an exhaust valve and a fuel injector, in which case the act of regulating the injection of fuel into the gas passage can be accomplished inside the engine via the fuel injector when the exhaust valve is open.

Another embodiment of the present disclosure is directed to an AT system having a controller.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 2 is a flow diagram of a method of cleaning the DEF injector in the AT system shown in FIG. 1.

DETAILED DESCRIPTION

Figure 1:
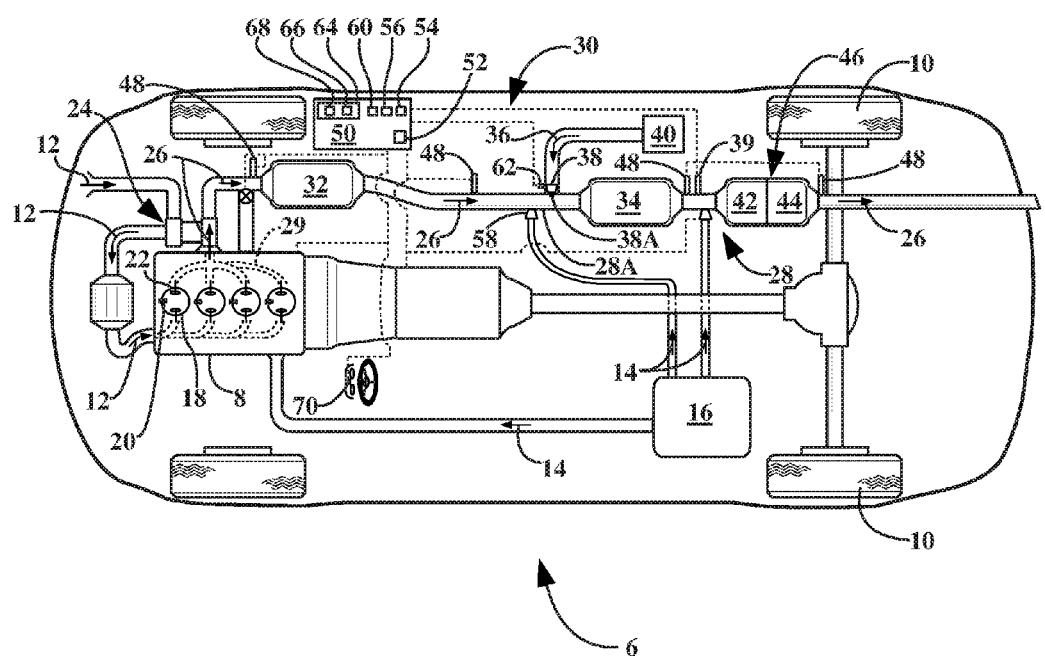
FIG. 1 is a schematic plan view of a vehicle having a diesel engine connected to an exhaust system having an after-treatment (AT) system using a "diesel-exhaust-fluid" (DEF) injector for reducing exhaust emissions.

Referring to the drawings, wherein like reference numbers refer to like components throughout the several views, FIG. 1 schematically depicts a motor vehicle 6. The vehicle 6 includes a compression-ignition or diesel internal combustion engine 8 configured to propel the vehicle via driven wheels 10. Internal combustion in the diesel engine 8 occurs when a specific amount of ambient air flow 12 is mixed with a metered amount of fuel 14 from a fuel tank 16 that is injected into engine's cylinders 18 via respective fuel injectors 20 and the resultant air-fuel mixture is compressed inside the cylinders.

As shown, the engine 8 includes a plurality of exhaust valves 22 and is fluidly connected to a turbocharger 24. The exhaust valves 22 are configured to selectively emit an exhaust gas flow 26 from individual cylinders 18 of the engine 8 into the turbocharger 24. The turbocharger 24 is energized by the exhaust gas flow 26 that is released by the engine 8 through the exhaust valves 22 following each combustion event. The turbocharger 24 is connected to an exhaust system 28 that receives exhaust gas flow 26 and eventually releases the gas flow to the ambient, typically on a side or aft of the vehicle 6. The engine 8 may also include an exhaust manifold (not shown) attached to the engine structure between the exhaust valves 22 and the turbocharger 24, or the engine may include exhaust passages 29 incorporated directly into the engine, such as the engine's cylinder head(s). Furthermore, although the turbocharger 24 is shown, nothing precludes the engine 8 from being configured and operated without such a power augmentation device.

The vehicle 6 also includes a diesel engine after-treatment (AT) system 30. The AT system 30 includes a number of exhaust after-treatment devices configured, i.e., constructed and arranged, to methodically remove particulate matter (PM) or soot, i.e., largely carbonaceous byproducts and emission constituents of engine combustion, from the exhaust gas flow 26. As shown, the AT system 30 operates as part of the exhaust system 28 which system includes an exhaust gas passage 28A that connects the AT system 30 to the engine 8. The AT system 30 includes a diesel oxidation catalyst (DOC) 32. The primary function of the DOC 32 is reduction of carbon monoxides (CO) and non-methane hydrocarbons (NMHC). Additionally, the DOC 32 is configured to generate nitrogen dioxide ($NO_2$), which is required by a selective catalytic reduction catalyst (SCR) 34 that is arranged downstream of the DOC 32. The DOC 32 typically contains a catalyst substance made up of precious metals, such as platinum and/or palladium, which function therein to accomplish the above-noted objectives. Generally, with respect to generation of $NO_2$, the DOC 32 becomes activated and reaches operating efficiency at elevated temperatures. Therefore, as shown in FIG. 1, the DOC 32 may be close-coupled to the turbocharger 24 in order to reduce loss of thermal energy from the exhaust gas flow 26 prior to the gas reaching the DOC.

The SCR 34, on the other hand, is configured to convert $NO_x$ into diatomic nitrogen ($N_2$) and water ($H_2O$) with the aid of the $NO_2$ generated by the DOC 32. Generally, the selective catalytic reduction (SCR) conversion process additionally requires a controlled or metered amount of a reductant having a general name of "diesel-exhaust-fluid" (DEF) 36 when the reductant is employed in diesel engines. The DEF 36 may be an aqueous solution of urea that includes water and ammonia ($NH_3$). The DEF 36 is introduced into the exhaust gas flow 26 via a DEF injector 38 from a reservoir 40 at a location in the AT system 30 that is downstream of the DOC 32 and upstream of the SCR 34. Accordingly, the DEF 36 accesses the SCR 34 as the exhaust gas flow 26 flows through the SCR. An inner surface of the SCR 34 includes a wash coat that serves to attract the DEF 36 such that the DEF may interact with the exhaust gas flow 26 in the presence of NO and $NO_2$, and generate a chemical reaction to reduce $NO_x$ emissions from the engine 8. The AT system 30 also includes a $NO_x$ sensor 39 arranged downstream of the SCR 34 and configured, i.e., constructed, to detect a level of $NO_x$ in the exhaust gas flow 26 aft of the SCR.

As shown, after the SCR 34, the exhaust gas flow 26 proceeds to a second diesel oxidation catalyst (DOC) 42 arranged in tandem with and upstream of a diesel particulate filter (DPF) 44. The DOC 42 and DPF 44 may be housed inside a single canister 46, as shown in FIG. 1. The DOC 42 is configured to oxidize hydrocarbons and carbon monoxide present in the exhaust gas flow 26 into carbon dioxide ($CO_2$) and water. The DPF 44 is configured to collect and dispose of the particulate matter emitted by the engine 8 prior to the exhaust gas flow 26 being discharged to the atmosphere. Accordingly, the DPF 44 acts as a trap for removing the particulate matter, specifically, soot, from the exhaust flow. Similar to the DOC 32 described above, each of the DOC 42 and the DPF 44 typically contains precious metals, such as platinum and/or palladium, which function as catalysts in the subject devices to accomplish their respective objectives. After passing through the DOC 42 and DPF 44 inside the canister 46, the exhaust gas flow 26 is deemed to be sufficiently cleaned of the noxious particulate matter and may then be allowed to exit the exhaust system 28 to the atmosphere.

The AT system 30 may also include a number of temperature probes, generally indicated with numeral 48, configured to sense temperature of the exhaust gas flow 26 at various points downstream of the engine 8. The AT system 30 also includes a controller 50. According to the disclosure, the controller 50 is configured to regulate operation of the engine 8, as well as operation of the AT system 30, including the exhaust after-treatment devices, namely the DOC 32, SCR 34, DOC 42, DPF 44, and the DEF injector 38. Additionally, the controller 50 is in electric communication with the $NO_x$ sensor 39 and the temperature probes 48 for receiving operating data to affect feedback control of the AT system 30 during operation of the engine 8.

The controller 50 may include a central processing unit (CPU) that regulates various functions and systems of the vehicle 6, or be configured as a powertrain control module (PCM) configured to control a hybrid-electric powertrain (not shown), an engine control module (ECM) configured to control the internal combustion engine 8 (shown in FIG. 1) or other alternative types of powerplants. The controller 50 may also be configured as a dedicated controller for the AT system 30. In order to appropriately control operation of the AT system 30, the controller 50 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 50 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 50 may also include a floppy disk, a flexible disk, hard disk, magnetic tape, any other magnetic medium, a CD-ROM, DVD, any other optical medium, etc. The controller 50 can be configured or equipped with other required computer hardware, such as a timer or high-speed clock 52 (which can be internal to the controller, as shown in FIG. 1), requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 50 or accessible thereby may be stored in the memory and automatically executed to provide the required functionality.

The DEF injector 38 includes a spray tip 38A configured to direct the DEF 36 into the gas passage 28A. During operation of the engine 8, a tip 38A of the DEF injector 38 may experience fouling from crystallized urea deposits.

Some modes of operation of the vehicle 6—for example, trailer towing—can generate elevated temperatures of the exhaust gas flow 26 proximate the injector spray tip 38A followed by a short-term or brief cool-down period, which have been shown to facilitate formation of urea deposits. Such conditions tend to increase a temperature of the DEF injector spray tip 38A without permitting a sufficient amount of time for the injector spray tip to cool-down to the temperature of the exhaust gas flow 26. In the event the DEF injector 38 is reactivated prior to its cool-down, the DEF 36 will be injected through a hot injector spray tip 38A sufficient to crystallize urea thereon. A urea crystal deposit at or in front of the injector spray tip 38A can continue to grow through additional cycles of the above-described operation. Ultimately, a sufficiently large deposit can adversely impact performance of the DEF injector 38, e.g., alter the DEF injection spray path and/or diminish the spray pattern, and may ultimately impact $NO_x$ emissions in the exhaust gas flow 26.

To counteract the formation of the urea deposits on the spray tip 38A of the DEF injector 38, the controller 50 is configured, i.e., programmed, to detect operation of the engine 8 that generates the exhaust gas flow 26 into the exhaust gas passage 28A. The controller 50 is also configured to detect a level of $NO_x$ in the exhaust gas flow 26 downstream of the SCR 34 via the $NO_x$ sensor 39. The controller 50 is additionally configured to activate the DEF injector 38 for a period of time 54 to reduce the level of $NO_x$ downstream of the SCR 34 to a predetermined $NO_x$ value 56. The predetermined $NO_x$ value 56 can be indicative of a maximum acceptable level of $NO_x$ emissions from the engine 8.

The controller 50 is further configured to regulate an injection of fuel 14 upstream of the SCR 34 to generate a stream of superheated exhaust gas 26 for cleaning the urea deposit from the spray tip 38A. Such a stream of superheated exhaust gas 26 can be generated by combustion of fuel in the passage 28A via injecting a metered amount of fuel 14 inside the engine 8 by the fuel injectors 20 and through open exhaust valves 22 into the passage 28A. Alternatively, the stream of superheated exhaust gas 26 can be generated via a dedicated auxiliary hydrocarbon (HC) injector 58 directly into the passage 28A upstream of the DEF injector 38. The spray tip 38A temperature will increase significantly from the superheated exhaust gas 26, thus cleaning or burning off the urea deposit from the injector spray tip. Temperatures higher than 100 Celsius will generally be sufficient to clean urea deposits from the injector spray tip 38A.

The stream of superheated exhaust gas 26 can be triggered by the controller 50 to clean the spray tip 38A if the period of time 54 that the DEF injector 38 needs to be activated to reduce the level of $NO_x$ downstream of the SCR 34 to the predetermined $NO_x$ value 56 is greater than a predetermined threshold period of time 60. In other words, the injection of fuel can be triggered if the DEF injector 38 requires to be activated for an excessive amount of time to reduce $NO_x$ emissions to a desired level. The timer 52 can be used by the controller 50 to assess the period of time 54 used to activate the DEF injector 38 required to reduce the level of $NO_x$ downstream of the SCR 34 to the predetermined $NO_x$ value 56.

The AT system 30 may also include a solenoid 62 operative to trigger the DEF injector 38. The solenoid 62 is in electronic communication with the controller 50. The controller 50 can be programmed with a look-up or data table 64 that correlates the period of time 54 used to activate the DEF injector 38 with a long-term adaption factor (LTAF) used to activate the solenoid 62. In general, the LTAF serves as a multiplication factor for adjusting the time required for activation of the solenoid 62 and the resultant DEF 36 injection. The reference data for the look-up table 64 can be compiled empirically during testing and validation of the AT system 30. The controller 50 is generally programmed to assess a change in LTAF during operation of the engine 8 and modify subsequent DEF 36 injection(s) to reduce the level of $NO_x$ downstream of the SCR 34 to the predetermined $NO_x$ value 56. As a result, typically, the LTAF will increase until a first threshold LTAF 66 set to trigger a procedure for cleaning the spray tip 38A of the DEF injector 38. As a result of the urea deposit at the spray tip 38A reducing effectiveness of the DEF injector 38 and the $NO_x$ emissions not being reduced at an intended rate, the urea deposit will impact, i.e., increase, the LTAF.

The predetermined threshold period of time 60 used to activate the DEF injector 38 can also be correlated with a first threshold LTAF 66 used by the controller 50, for example as part of the look-up table 64, as shown in FIG. 1, to activate the solenoid 62. The first threshold LTAF 66 can be indicative of the crystallized urea deposit having formed at the spray tip 38A of the DEF injector 38, in the above-described case wherein the spray pattern generated by the DEF injector is being negatively impacted by the urea deposit. The first threshold LTAF 66 can be set in a range of 1.1-1.3. To dispose of the urea deposit at the spray tip 38A, the fuel injectors 20 or the auxiliary hydrocarbon injector 58 can be regulated by controller 50 to inject fuel 14 to burn off thus assessed urea deposit at the spray tip 38A of the DEF injector 38. Accordingly, the first threshold LTAF 66 can be employed by the controller 50 to trigger the cleaning procedure for the spray tip 38A.

The controller 50 can be additionally programmed with a second threshold LTAF 68 that can be correlated to and therefore be indicative of a predetermined amount of $NO_x$ detected downstream of the SCR 34. As shown in FIG. 1, the second threshold LTAF 68 can, for example, be programmed into the controller as part of the look-up table 64. According to the disclosure, the second threshold LTAF 68 can be set greater than the first threshold LTAF 66, for example by at least 10%. The controller can be further configured to generate a sensory signal 70 if the second threshold LTAF 68 is reached. The sensory signal 70 can be a predetermined numerical code, or a visual or audible display, intended to be set as a warning to an operator of the vehicle 6 indicating a need to service the AT system 30, and/or for informational support to a service technician tasked with diagnosing AT system concerns.

FIG. 2 depicts a method 80 of controlling the AT system 30 when such is connected to the engine 8 via the gas passage 28A, as described above with respect to FIG. 1. The method initiates in frame 82, where it includes detecting, via the controller 50, an operation of the engine 8 generating the flow of exhaust gas 26 directed into the gas passage 28A. After frame 82, the method advances to frame 84 where the method includes detecting, via the controller 50 using the $NO_x$ sensor 39, a level of $NO_x$ in the exhaust gas 26 downstream of the SCR 34. Following frame 84, the method proceeds to frame 86 where the method includes activating, via the controller 50, the DEF injector 38 for the period of time 54 to reduce the level of $NO_x$ downstream of the SCR 34 to the predetermined $NO_x$ value 56. In frame 84, the method can also include assessing, such as measuring, the period of time 54 using the controller timer 52.

After frame 86, the method proceeds to frame 88 and includes regulating, via the controller 50, the injection of fuel 14 upstream of the DEF injector 38, either by the fuel injector 20 inside the engine 8 or via the HC injector 58 directly into the passage 28A, if the period of time used to reduce the level of $NO_x$ downstream of the SCR to the predetermined $NO_x$ value 56 is greater than the predetermined threshold period of time 60. As described with respect to FIG. 1 above, the injection of fuel 14 upstream of the DEF injector 38 is intended to generate a stream of superheated exhaust gas 26 to clean the DEF injector, if the DEF injector has to be activated for an excessive amount of time to reduce $NO_x$ emissions to the desired level.

In frame 86 and/or in frame 88, the method can include correlating, via the controller 50, the period of time 54 used to activate the DEF injector 38 with the LTAF used by the controller to activate the solenoid 62, as described with respect to FIG. 1. Additionally, in frame 88, the method can include correlating the predetermined threshold period of time 60 with the first threshold LTAF used by the controller 50 to activate the solenoid 62. As described with respect to FIG. 1, the controller 50 can also be programmed with the look-up table 64 correlating the period of time 54 used to activate the DEF injector 38 with the LTAF. After injection of fuel 14 upstream of the DEF injector 38 in frame 88, the method may loop back to frame 82. Alternatively, following frame 88, the method may advance to frame 90. In frame 90 the method can include generating the sensory signal 70 to indicate a necessity for servicing the AT system 30 if the second threshold LTAF has been reached.

Overall, the method 80 is intended to detect a urea deposit on the DEF injector 38 and trigger a DEF injector tip 38A clean-up procedure. Such a clean-up procedure can be used to avoid the vehicle 6 being erroneously identified as using DEF 36 of inadequate quality and the vehicle being in need of service.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of controlling an exhaust after-treatment (AT) system connected to a diesel internal combustion engine via a gas passage and having a diesel oxidation catalyst (DOC) and a "diesel-exhaust-fluid" (DEF) injector arranged downstream of the DOC and upstream of a selective catalytic reduction catalyst (SCR), the method comprising:
  detecting, via a controller, an operation of the engine generating a flow of exhaust gas directed into the gas passage;
  detecting, via the controller using a nitrogen oxide ($NO_x$) sensor, a level of nitrogen oxide in the exhaust gas downstream of the SCR;
  activating, via the controller, the DEF injector for a period of time to reduce the level of $NO_x$ downstream of the SCR to a predetermined $NO_x$ value; and
  regulating, via the controller, an injection of fuel upstream of the DOC to generate a stream of superheated exhaust gas and thereby clean the DEF injector if the period of time used to reduce the level of $NO_x$ downstream of the SCR to the predetermined $NO_x$ value is greater than a predetermined threshold period of time.

2. The method of claim 1, wherein the controller includes an timer, the method further comprising assessing the period of time used to activate the DEF injector to reduce the level of $NO_x$ downstream of the SCR to the predetermined $NO_x$ value using the timer.

3. The method of claim 1, wherein the AT system additionally includes a solenoid in electronic communication with the controller and operative to trigger the DEF injector, the method further comprising:
  correlating, via the controller, the period of time used to activate the DEF injector with a long-term adaption factor (LTAF) used to activate the solenoid; and
  correlating, via the controller, the predetermined threshold period of time used to activate the DEF injector with a first threshold LTAF used by the controller to activate the solenoid.

4. The method of claim 3, wherein the controller is programmed with a look-up table correlating the period of time used to activate the DEF injector with the LTAF.

5. The method of claim 3, wherein the DEF injector includes a spray tip configured to direct the DEF into the gas passage, and wherein the first threshold LTAF is indicative of a urea deposit having formed at the spray tip of the DEF injector.

6. The method of claim 5, wherein said regulating the injection of fuel is configured to burn off the urea deposit at the spray tip of the DEF injector.

7. The method of claim 1, wherein the controller is programmed with a second threshold LTAF indicative of a predetermined amount of $NO_x$ detected downstream of the SCR, and wherein the second threshold LTAF is greater than the first threshold LTAF, further comprising generating a sensory signal if the second threshold LTAF is reached.

8. The method of claim 7, wherein the diesel engine is installed in a vehicle, and wherein the first threshold LTAF is in a range of 1.1-1.3.

9. The method of claim 8, wherein the second threshold LTAF is greater than the first threshold LTAF by at least 10%.

10. The method of claim 1, wherein the engine includes an exhaust valve and a fuel injector, and wherein said regulating the injection of fuel into the gas passage is accomplished inside the engine via the fuel injector when the exhaust valve is open.

11. An exhaust after-treatment (AT) system in fluid communication with a diesel internal combustion engine via a gas passage, the AT system comprising:
  a diesel oxidation catalyst (DOC);
  a selective catalytic reduction catalyst (SCR) arranged downstream of the DOC;
  a "diesel-exhaust-fluid" (DEF) injector arranged downstream of the DOC and upstream of the SCR; and
  a controller configured to:
    detect an operation of the engine generating a flow of exhaust gas directed into the gas passage;
    detect a level of nitrogen oxides ($NO_x$) in the exhaust gas downstream of the SCR via a $NO_x$ sensor in communication with the controller;

activate the DEF injector for a period of time to reduce the level of $NO_x$ downstream of the SCR to a predetermined $NO_x$ value; and regulate an injection of fuel upstream of the DOC to generate a stream of superheated exhaust gas and thereby clean the DEF injector if the period of time used to reduce the level of $NO_x$ downstream of the SCR to the predetermined $NO_x$ value is greater than a predetermined threshold period of time.

12. The AT system of claim 11, wherein the controller includes an timer configured to assess the period of time used to activate the DEF injector to reduce the level of $NO_x$ downstream of the SCR to the predetermined $NO_x$ value.

13. The AT system of claim 11, further comprising a solenoid in electronic communication with the controller and operative to trigger the DEF injector, wherein the period of time used to activate the DEF injector is correlated with a long-term adaption factor (LTAF) programmed into the controller used to activate the solenoid, and wherein the predetermined threshold period of time used to activate the DEF injector is correlated with a first threshold LTAF used by the controller to activate the solenoid.

14. The AT system of claim 13, wherein the controller is additionally programmed with a look-up table correlating the period of time used to activate the DEF injector with the LTAF.

15. The AT system of claim 13, wherein the DEF injector includes a spray tip configured to direct the DEF into the gas passage, and wherein the first threshold LTAF is indicative of a urea deposit having formed at the spray tip of the DEF injector.

16. The AT system of claim 15, wherein the regulation of the injection of fuel is configured to burn off the urea deposit at the spray tip of the DEF injector.

17. The AT system of claim 11, wherein:
the controller is additionally programmed with a second threshold LTAF indicative of a predetermined amount of $NO_x$ detected downstream of the SCR;
the second threshold LTAF is greater than the first threshold LTAF; and
the controller is additionally configured to generate a sensory signal if the second threshold LTAF is reached.

18. The AT system of claim 17, wherein the diesel engine is installed in a vehicle, and wherein the first threshold LTAF is in a range of 1.1-1.3.

19. The AT system of claim 18, wherein the second threshold LTAF is greater than the first threshold LTAF by at least 10%.

20. The AT system of claim 11, wherein the engine includes an exhaust valve and a fuel injector, and wherein said regulating the injection of fuel into the gas passage is accomplished inside the engine via the fuel injector when the exhaust valve is open.

* * * * *